Figure 1:
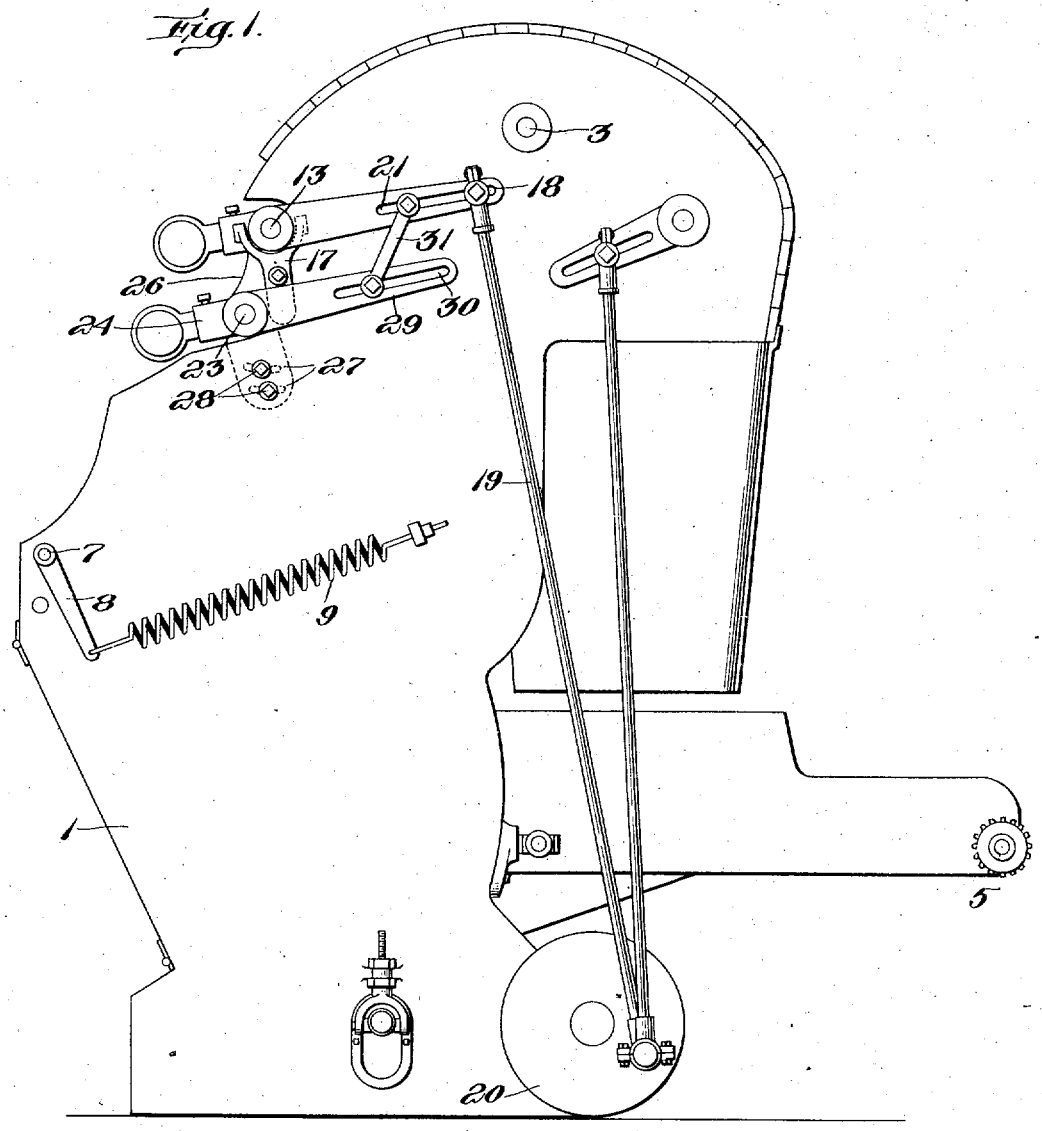

No. 12,740. REISSUED JAN. 14, 1908.

S. W. WOODBURY.

FIBROUS STOCK FEEDER.

APPLICATION FILED JUNE 4, 1907.

3 SHEETS—SHEET 1.

Witnesses:
Joseph T. Brennan.
C. D. Wadkeny

Inventor:
Stephen W. Woodbury,
by Roberts & Mitchell,
Attys.

THE NORRIS PETERS CO., WASHINGTON, D. C.

No. 12,740. REISSUED JAN. 14, 1908.

S. W. WOODBURY.

FIBROUS STOCK FEEDER.

APPLICATION FILED JUNE 4, 1907.

3 SHEETS—SHEET 2.

Witnesses:
Joseph T. Brennan.
C. D. Wockery

Inventor:
Stephen W. Woodbury,
by Roberts & Mitchell,
Attys.

THE NORRIS PETERS CO., WASHINGTON, D. C.

No. 12,740. REISSUED JAN. 14, 1908.

S. W. WOODBURY.

FIBROUS STOCK FEEDER.

APPLICATION FILED JUNE 4, 1907.

3 SHEETS—SHEET 3.

Witnesses:
Joseph T. Brennan,
C. S. Woodbury

Inventor:
Stephen W. Woodbury,
by Roberts & Waterbury,
Attys.

THE NORRIS PETERS CO., WASHINGTON, D. C.

UNITED STATES PATENT OFFICE.

STEPHEN W. WOODBURY, OF NEWTON HIGHLANDS, MASSACHUSETTS, ASSIGNOR TO SYDNEY HARWOOD, OF NEWTON, MASSACHUSETTS, AND JOHN H. HARWOOD, OF BROOKLINE, MASSACHUSETTS, COPARTNERS.

FIBROUS-STOCK FEEDER.

No. 12,740. Specification of Reissued Letters Patent. Reissued Jan. 14, 1908.

Original No. 843,126, dated February 5, 1907, Serial No. 312,280. Application for reissue filed June 4, 1907. Serial No. 377,267.

*To all whom it may concern:*

Be it known that I, STEPHEN W. WOODBURY, a citizen of the United States, residing at Newton Highlands, in the county of Middlesex and State of Massachusetts, have invented certain new and useful Improvements in Fibrous-Stock Feeders, of which the following is a specification.

This invention appertains to the class of mechanisms designed chiefly for feeding fibrous stock—such as silk, jute, tow, flax, hemp, wool, cotton, shoddy, and the like—to textile and other types of machines for working the material into commercial form.

The invention relates most especially to the type of machines in which the stock is fed in bulk into a hopper and is carried therefrom by means of a toothed conveyer and delivered upon a carrier, by means of which it is supplied to the machine with which the feeder coöperates, said machine also embodying an evener and a picker. For long fibrous stock the machine as generally constructed is inadequate and unsatisfactory because of the tendency of the stock to mat, and as a consequence to feed unevenly, this being due chiefly to the material collecting upon the evener and adhering thereto.

In accordance with the present invention a clearer is provided and coöperates with the evener to prevent clogging thereof by the material or the matting of the latter, said clearer moving simultaneously with the evener but at a faster rate of speed, the evener and clearer being of comb shape—that is embodying a body and teeth extended therefrom.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 2:
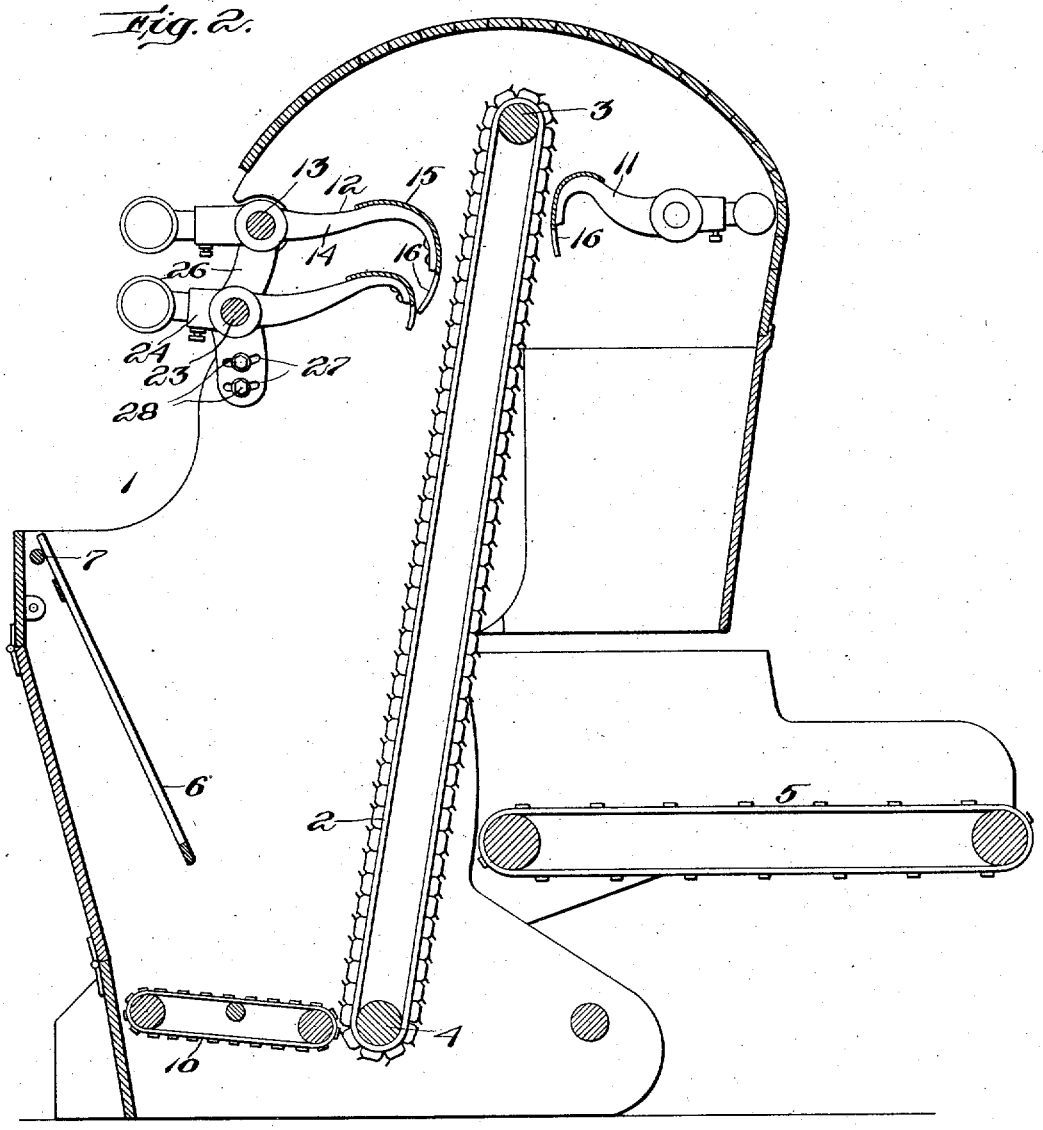
Figure 3:
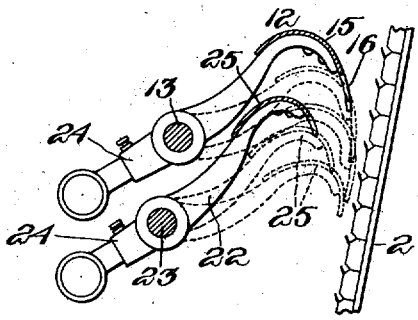
Figure 4:
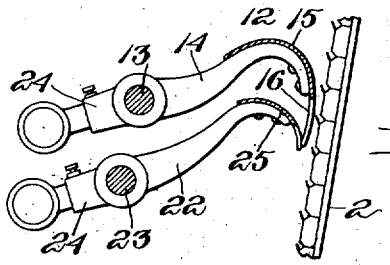
Figure 5:
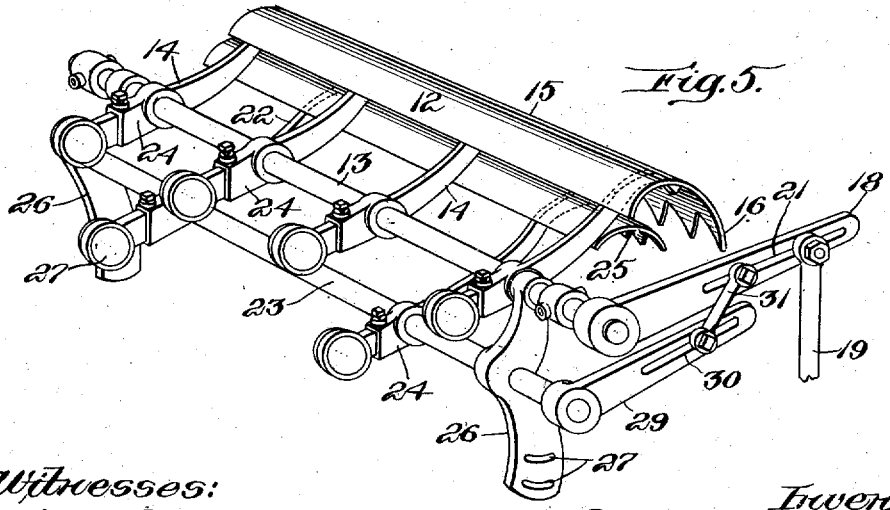

Figure 1 is a side view of a feeder embodying the invention. Fig. 2 is a vertical longitudinal section thereof. Fig. 3 is a detail view of the evener and clearer and a portion of the toothed conveyer, the dotted lines showing different positions of the combs. Fig. 4 is a view of the parts shown in Fig. 3, showing the evener and clearer midway of their stroke. Fig. 5 is a detail perspective view of the evener and clearer, the mountings therefor, and the power-transmitting devices.

Corresponding and like parts are referred to in the following description and indicated in all the views of the drawings by the same reference characters.

The framework 1 of the machine may be of any construction and design, according to the special adaptation of the invention and the particular nature of the work for which the feeder is designed. The toothed conveyer 2 is located within the framework in the accustomed manner and is mounted upon an upper roller 3 and a lower roller 4 and is adapted to be driven so that the portion facing the hopper or receiving side of the machine travels upward to carry the fibrous stock upward and deliver the same upon a horizontally-arranged carrier 5, by means of which it is delivered to the machine with which the feeder coöperates. A spring-actuated rack 6 is arranged at the front side of the hopper and presses the stock against the toothed conveyer, said rack being attached to a shaft 7, provided with an arm 8 at one end, to which a spring 9 is attached. An endless carrier 10 forms the bottom of the hopper, and its upper portion travels toward the conveyer 2. The endless carrier 10 is mounted upon suitable rollers at and intermediate of its ends. The usual picker 11 is arranged near the upper end of the conveyer upon the delivery side thereof, its purpose being to remove the material from the teeth of the conveyer 2, so it will drop upon the carrier 5 to be delivered to the machine supplied by means of the feeder.

An evener 12 is located near the upper end of the receiving side of the conveyer 2 and comprises a shaft 13, counterweighted arms 14, and a comb 15, the same being formed, preferably, of plate or sheet metal secured to the arms 14 and having its outer lower edge serrated or otherwise formed to provide a plurality of teeth 16. The shaft 13 is mounted in suitable bearings 17, attached to the sides of the framework 1, and is provided at one end with an arm 18, to which movement is imparted, by means of a pitman 19, from any convenient moving part of the machine, such as the crank-wheel 20. The arm 18 is formed with a longitudinal slot 21 to admit of adjustable connection of the pitman 19 thereof to vary the throw of the evener or comb 12, as may be required. The clearer 22 is somewhat similar in construction to the evener and comprises a shaft 23, counterweighted arms 24, and a comb 25, the same consisting of a plate having its outer lower edge toothed. The shaft 23 is loosely mounted in arms 26, which are also loose upon the shaft 13 and have adjustable connection at their lower ends with the sides of the framework 1. Transversely-curved slots 27 are formed in the lower ends of the arms 26 and receive fastenings 28, by means of which the lower ends of the arms 26 are secured in the located position. The construction is such as to admit of the relative adjustment of the evener 12 and the clearer 22, so that the latter may be moved to cause its teeth to operate at a greater or less distance from the teeth of the evener 12. An arm 29 is fast to the outer end of the shaft 23 and is formed with slot 30. A link 31 connects the arms 18 and 29 and has pivotal and adjustable connection at its ends therewith.

Rocking movement is imparted to the arm 18 and transmitted from said arm by means of the link 31 to the arm 29. By varying the distance of the points of connection of the link 31 with the respective arms 18 and 29 movement of the combs 12 and 22 may be varied and adjusted. The link 31 usually is connected to the arm 18 at a greater distance from the shaft 13 than the distance between its point of connection with the arm 29 from the shaft 23. While both arms 18 and 29 move together in the same direction, the arm 29 receives a greater amplitude of movement and consequently travels faster. The combs 12 and 22, connected with the respective shafts 13 and 23, to which the arms 18 and 29 are attached, receive a corresponding movement. As the comb or evener 12 travels upward the comb or clearer 22 likewise travels upward, but at a greater speed, and upon the downstroke of the evener or comb 12 the part 22 likewise moves downward, but at a higher speed. The teeth of the combs 12 and 22 are adjusted to come close together when the evener or comb 12 is about midway of its stroke, as shown most clearly in Fig. 2 and by dotted lines in Fig. 3, and upon the continued downward movement of the comb 12 the teeth of the comb 22 pass ahead and clear the teeth of the comb 12 and permit the same to remove surplus material adhering to the teeth of the conveyer 2. This is of essential advantage when operating upon stock having long fiber, since it prevents matting of the same and clogging of the evener-comb. The relative speeds of the combs 12 and 22 may be regulated by proper adjustment of the link 31 with reference to the arms 18 and 29, as will be readily understood.

Having thus described the invention, what is claimed as new is—

1. In a machine of the character specified, the combination of a toothed conveyer, a vibratory evener-comb coöperating therewith for removing surplus material, a vibratory clearer coöperating with the evener-comb to prevent the material clogging and matting upon the same, and a link connection between the evener and clearer for causing the comb and clearer to move in unison and at different relative speeds, the clearer having a faster movement imparted thereto.

2. In a machine of the character specified, the combination of a toothed conveyer, a vibratory evener-comb comprising a shaft mounted in bearings, outer bearings pivotally mounted upon the shaft of the evener, means for securing the pivoted bearings in an adjusted position, a clearer mounted upon the pivoted bearings and adapted to coöperate with the evener, and connecting means between the evener and clearer for causing the two to move in unison but at different relative speeds.

3. In a machine of the character specified, the combination of a toothed conveyer, a shaft, a vibratory evener-comb mounted upon said shaft to oscillate therewith, bearings pivotally mounted upon the shaft carrying the evener-comb, means for securing said bearings in an adjusted position, a second shaft mounted in the pivoted bearings, a clearer-comb mounted upon the second shaft to oscillate therewith, arms projected from the shafts carrying the evener and clearer, a link connecting said arms to cause them to move in unison but at different relative speeds, and means for imparting movement to one of said arms.

4. In a feeder of the character described, the combination with the toothed conveyer apron and the vibratory evener comb coöperating therewith, of a second vibratory comb coöperating both with the evener comb and with the toothed conveyer, means to oscillate the evener comb, and means to oscillate the second vibratory comb to cause it, during its forward or operative stroke, first to clear the evener comb and then partially to remove surplus material from the conveyer apron.

5. In a feeder of the character specified, the combination with the toothed conveyer, of a vibratory evener - comb coöperating therewith for removing surplus material, a second vibratory comb coöperating with the evener - comb and with the toothed conveyer, means for causing the two combs to move in unison and at different relative speeds, the latter comb having a faster movement imparted thereto, whereby the latter comb will in its forward movement first clear the evener comb and then pass it by, partially to remove surplus material from the conveyer before such material reaches the evener comb.

6. In a feeder of the character specified, the combination with the upright toothed conveyer apron and the vibratory evener-comb journaled upon the framework of the machine and coöperating with the conveyer apron to remove surplus material therefrom, of a second vibratory comb below the evener comb also journaled upon the framework of the machine coöperating both with the evener comb and with the conveyer apron, and means to move said combs in unison at different relative speeds, a faster movement being imparted to the second comb, whereby the second comb will pass the evener comb during their operative strokes first to clear the evener comb, and then partially to remove surplus material from the conveyer before it reaches the evener comb.

STEPHEN W. WOODBURY.

Witnesses:

ROBERT CUSHMAN,

CHARLES D. WOODBERRY.